US011898735B2

(12) United States Patent
Chavan et al.

(10) Patent No.: US 11,898,735 B2
(45) Date of Patent: Feb. 13, 2024

(54) OPTICS CLOCKING FOR LUMINARIES

(71) Applicant: EATON INTELLIGENT POWER LIMITED, Dublin (IE)

(72) Inventors: Poonam Arun Chavan, Pin (IN); Timothy Michael Burns, Elbridge, NY (US); Daniel James Broe, Liverpool, NY (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/674,311

(22) Filed: Feb. 17, 2022

(65) Prior Publication Data

US 2022/0260242 A1 Aug. 18, 2022

(30) Foreign Application Priority Data

Feb. 18, 2021 (IN) ............................. 202111006819

(51) Int. Cl.

| | |
|---|---|
| ***F21V 14/06*** | (2006.01) |
| ***F21V 17/02*** | (2006.01) |
| ***F21V 29/74*** | (2015.01) |
| ***F21V 29/85*** | (2015.01) |

(52) U.S. Cl.

CPC .............. *F21V 29/74* (2015.01); *F21V 14/06* (2013.01); *F21V 17/02* (2013.01); *F21V 29/85* (2015.01)

(58) Field of Classification Search

CPC ................................. F21V 14/06; F21V 17/02

See application file for complete search history.

(56) References Cited

U.S. PATENT DOCUMENTS

| | | | | |
|---|---|---|---|---|
| 2007/0109813 | A1 | 5/2007 | Copeland et al. | |
| 2013/0010470 | A1* | 1/2013 | Min | F21V 7/18 362/238 |
| 2016/0084481 | A1 | 3/2016 | Duckworth | |
| 2017/0205050 | A1 | 7/2017 | Neuer et al. | |
| 2020/0348008 | A1* | 11/2020 | Shen | F21V 5/045 |

FOREIGN PATENT DOCUMENTS

| | | | |
|---|---|---|---|
| CN | 102141223 | A | 8/2011 |
| CN | 202109351 | U | 1/2012 |
| CN | 102168831 | B | 4/2014 |
| IT | 10201900003265 | A1 | 9/2020 |

OTHER PUBLICATIONS

Extended European Search Report for Application No. 22157547.5 dated Jul. 18, 2022, 9 pages.

* cited by examiner

*Primary Examiner* — Sean P Gramling

(74) *Attorney, Agent, or Firm* — Merchant & Gould P.C.

(57) ABSTRACT

The present disclosure relates generally to a “clocking” mechanism that give customers the flexibility to adjust light output distribution of luminaires to a desired level. The “clocking” mechanism gives the flexibility to adjust a position of a retainer ring of a LED system with respect to a mounting module that includes a heat sink adapter housing.

19 Claims, 9 Drawing Sheets

OPTICS CLOCKING FOR LUMINARIES

CROSS-REFERENCE TO RELATED APPLICATION

This application claims the benefit of Indian Provisional Patent Application No. 202111006819, filed on Feb. 18, 2021, the disclosure of which is incorporated herein by reference in its entirety.

TECHNICAL FIELD

The present disclosure relates generally to light emitting diode (LED) lighting systems, and more specifically, to LED luminaries.

BACKGROUND

Light Emitting Diode (LED) can provide instant illumination with no warm-up required. LED luminaires are engineered to provided maintenance-free operation while delivering long life and high lumen performance. Luminaries feature custom optics designed to maximize light distribution and intensity while providing flexibility for retrofits or new installations throughout a site.

Light emitted from LED luminaires can be distributed in predetermined orientations and patterns for an illuminated area. Luminaries may have three optical options designed to maximize light distribution and intensity. The pattern of the illuminated area by LED luminaries is established by the Illumination Engineering Society of North American (IESNA). IESNA Type I provides an optic pattern that is a long and rectangular light distribution that can be ideal for hallways, walkways, loading docks, catwalks, etc. IESNA Type-III provides an optic pattern that has a three-way light distribution and is ideal for narrow crosswalks, passages with wall mounted fixture, tunnels with wall mount, etc. IESNA Type-V provides an optic pattern that is a regular circular distribution pattern ideal for high/low bay indoor and outdoor ceilings, pendants, large buildings, warehouses, etc.

Light distribution from luminaries may be offset or incorrectly positioned with respect to a road, sidewalk, etc. As such, IESNA Type-I and IESNA Type-III optic patterns can be adjusted in the field as desired.

There is a need for improved flexibility when adjusting light beam outputs of luminaries.

SUMMARY

The present disclosure relates generally to a "clocking" mechanism that give customers the flexibility to adjust light output distribution for luminaires to a desired level or orientation so that a given light distribution pattern effectively illuminates a desired location. The "clocking" mechanism gives the flexibility to adjust a position of a retainer ring of a LED system with respect to a mounting module that includes a heat sink adapter housing.

These and other features and advantages will be apparent from a reading of the following detailed description and a review of the associated drawings. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
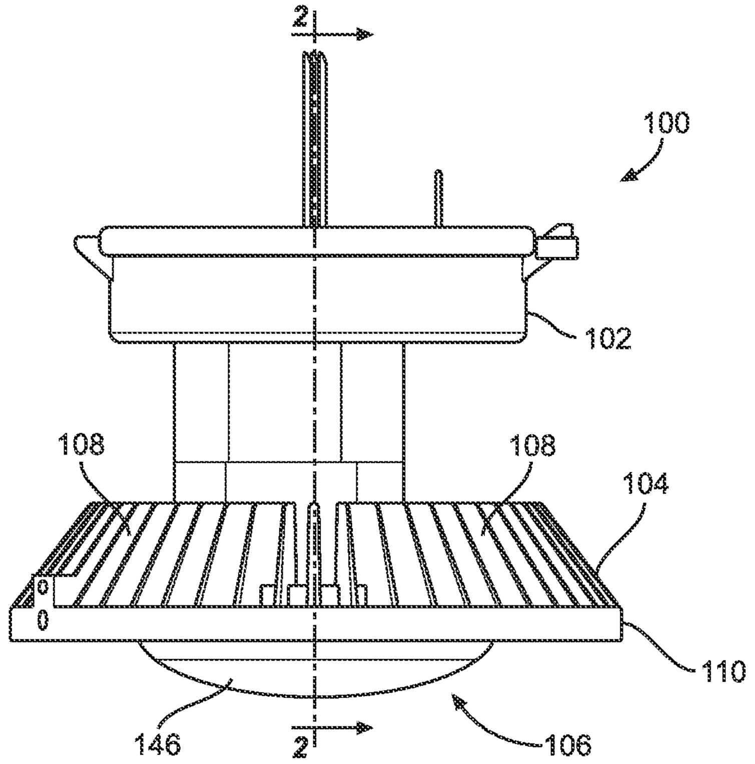
FIG. 1 illustrates a side view of a light system in accordance with principles of the present disclosure.
Figure 2:
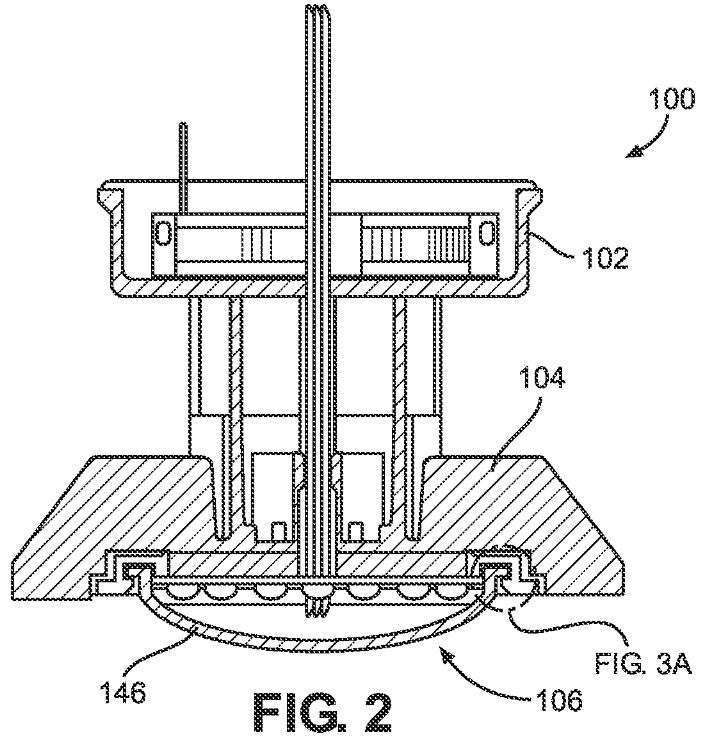
FIG. 2 illustrates a cross-sectional side view of the light system of FIG. 1.

FIGS. 1-2 illustrate an example light system 100. The light system 100 includes a driver compartment 102, a heat sink adapter housing 104 (e.g., housing), and a LED system 106 (e.g., light engine). The driver compartment 102 is configured to house a driver assembly (not shown) that can include a power supply and enable operation thereof. In certain examples, the light system 100 can be mounted to a ceiling, a wall, or other structure via a mounting bracket (not shown) secured to the driver compartment 102. It will be appreciated that the light system 100 includes a front side configured to face away from a wall or ceiling to which the light system 100 mounts, and a back side configured to face toward the wall or ceiling to which the light system 100 mounts.

Figure 11:
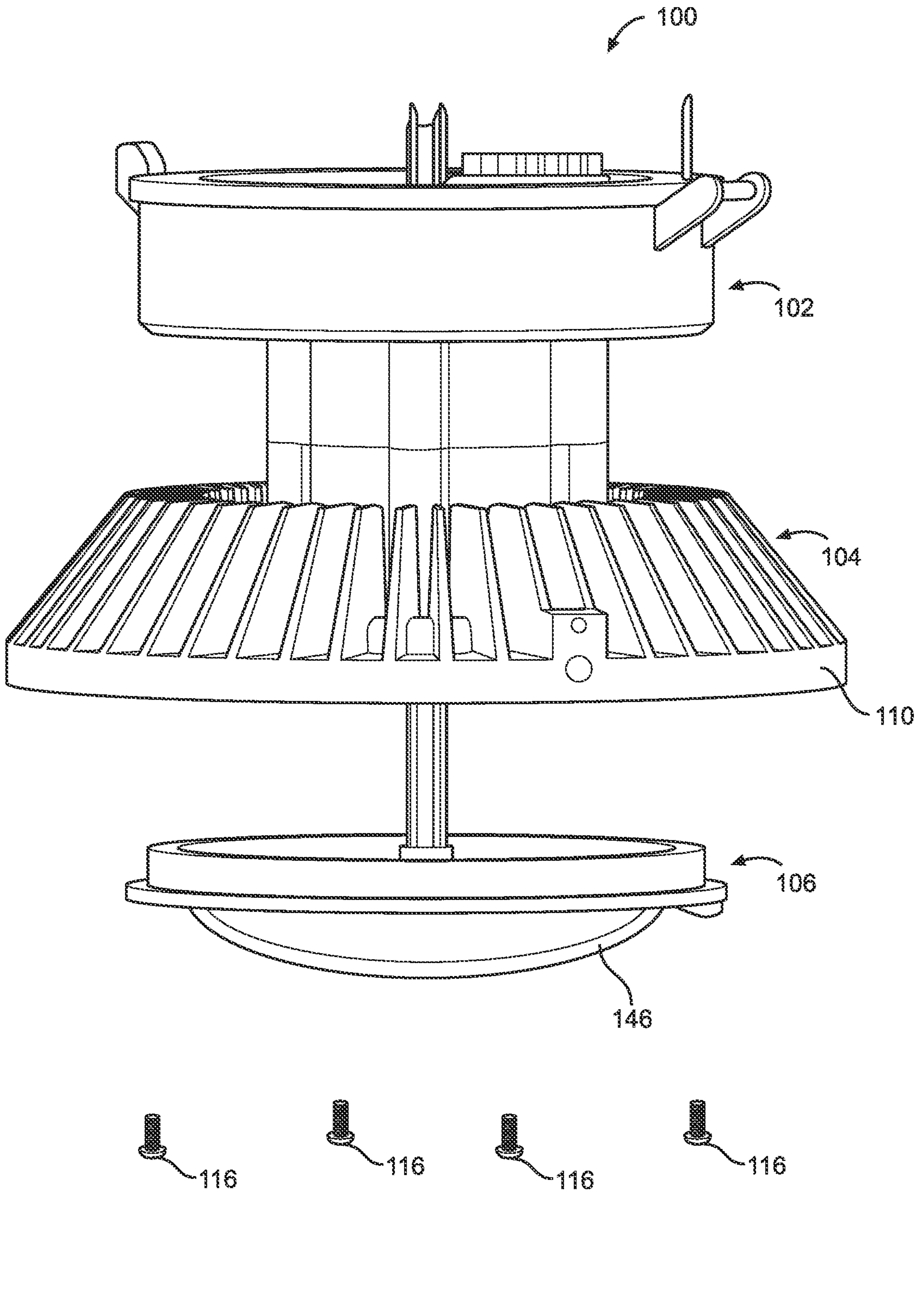
FIG. 11 illustrates a partial exploded view of the light system of FIG. 1 showing the LED system exploded from a heat sink adapter housing.

The heat sink adapter housing 104 can be coupled to the driver compartment 102 to be fixed thereto. The heat sink adapter housing 104 includes a plurality of parallel-oriented fins 108 that are integrally formed with a base 110 to ensure good thermal conductivity. Any heat generated by the LED system 106 can be drawn into the heat sink adapter housing 104 to dissipate the heat. That is, the heat sink adapter housing 104 acts as a heat spreader (thermally conductive) to distribute heat and to provide a relatively large surface area for allowing heat to be transferred to the surrounding air. The heat sink adapter housing 104 may be made of aluminum, brass, copper, polymer steel, or any other material that is thermally conductive. The base 110 of the heat sink adapter housing 104 has a front surface 112 that provides a mounting platform 114 for the LED system 106. The LED system 106 can be removably mounted to the front surface 112 of the heat sink adapter housing 104 by one or more fasteners 116 (see FIG. 11).

Figure 3:
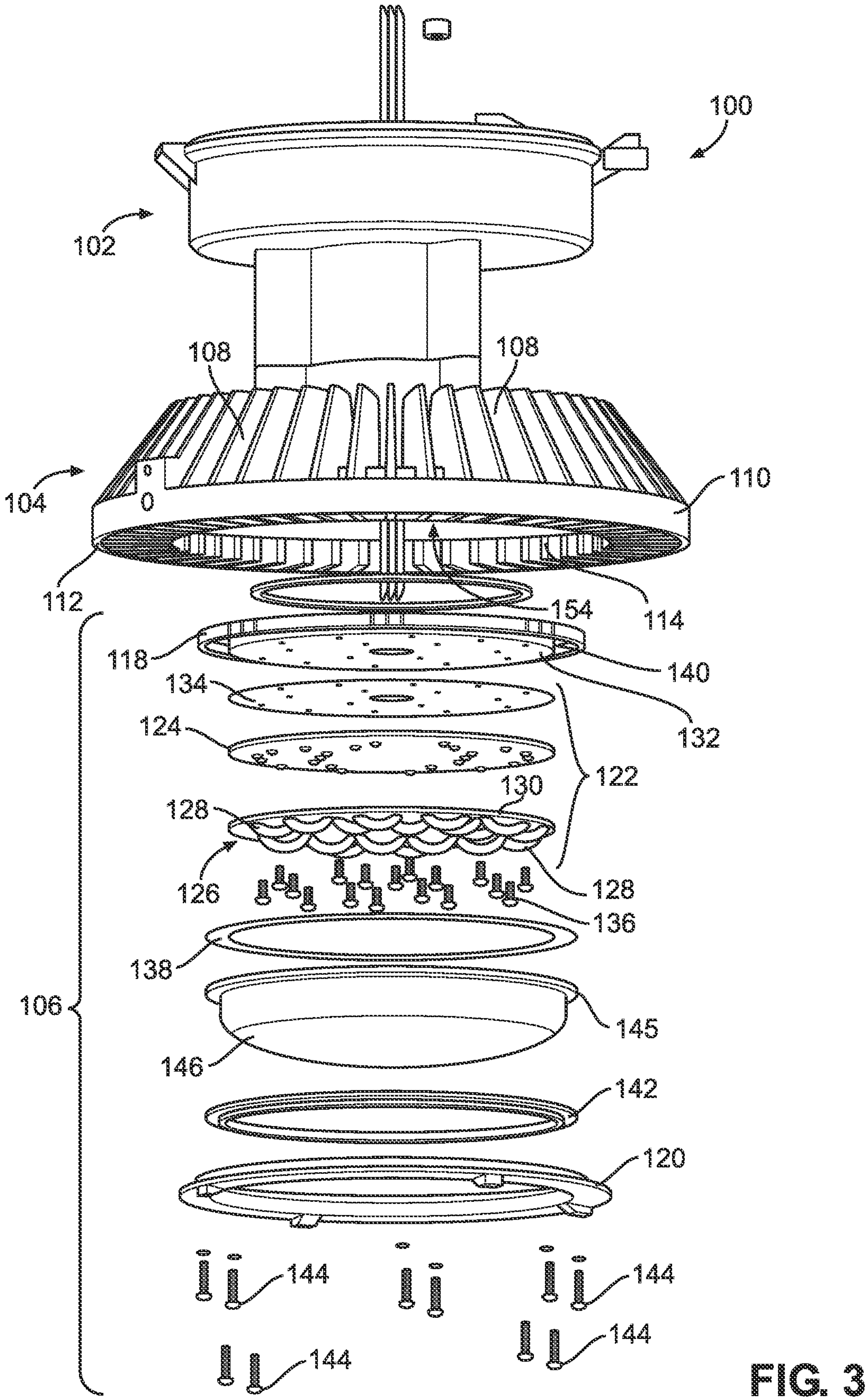
FIG. 3 illustrates an exploded view of a LED system of the light system of FIG. 1.

Turning to FIG. 3, an exploded view of the LED system 106 is shown. The LED system 106 can include a baseplate 118, a retainer ring 120, and a LED sub-assembly 122. The LED sub-assembly 122 can include a printed circuit board assembly (PCBA) 124 and optics 126. The optics 126 can include one or more light emitting diodes (LEDs) 128 coupled to a substrate 130. The PCBA 124 can provide the necessary electrical connections to the optics 126 and other electrical components of the light system 100.

The baseplate 118 includes an outer surface 132 that may be covered by a thermal pad 134. Adhesive on the thermal pad 134 glues the thermal pad 134 to the outside surface 132 of the baseplate 118. The optics 126 and the PCBA 124 can be fastened together to the baseplate 118 with a plurality of screws 136 to fix the optics 126 relative within the LED system 106.

Figure 3A:
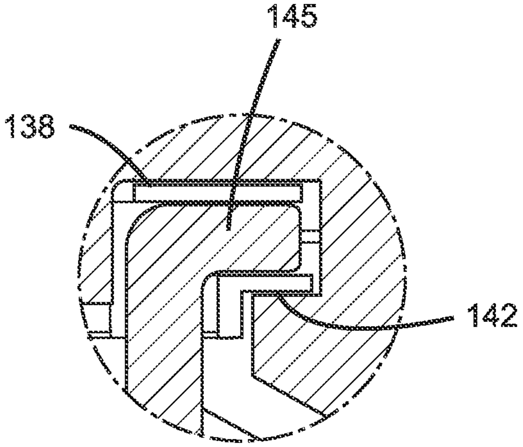
FIG. 3A illustrates a partial cross-sectional view of FIG. 2.

A first gasket 138 may be disposed in a groove 140 in the outer surface 132 of the baseplate 118. The first gasket 138 may be pressed into the groove 140 to create an environmental seal with a back side of an outer flange 145 of a protective lens 146 when the retainer ring 120 is attached to the baseplate 118. The retainer ring 120 can be attached to the baseplate 118 via one or more screws 144 with a second gasket 142 located between the retainer ring 120 and a front side of the outer flange 145 of the lens 146. The first and second gaskets 138, 142 can provide a seal as shown in FIG. 3A that provides suitable ingress protection against solids and liquids (i.e., intrusion of dust, dirt, accidental contact, and water) into a compartment defined by the protective lens 146.

As indicated above, the LED system 106 may also include the lens 146 having an outer flange disposed (e.g., clamped) between the baseplate 118 and the retainer ring 120. The lens 146 may at least partially surround the optics 126 and the PCBA 124 and enclose them on the baseplate 118. The lens 146 may be made of any at least partially transparent or translucent material, including glass and hard plastics, so as to enable light to be emitted from the light system 100. The lens 146 may also provide a protective barrier for the optics 126 and shield the optics 126 from moisture or inclement weather. The retainer ring 120 is configured to secure together all the components of the LED system 106. The one or more screws 144 mount the retainer ring 120 to the baseplate 118 to form the LED system 106 as a fixed unit.

In operation, the optics 126 can emit light so that the light system 100 can illuminate a required or desired area. The light emitted from the optics 126 can be distributed in predetermined orientations and patterns for the desired illuminated area. That is, the light system 100 may be configured for a specific light distribution profile to project a predetermined pattern of light onto a surface (e.g., a walkway, roadway).

Figure 4:
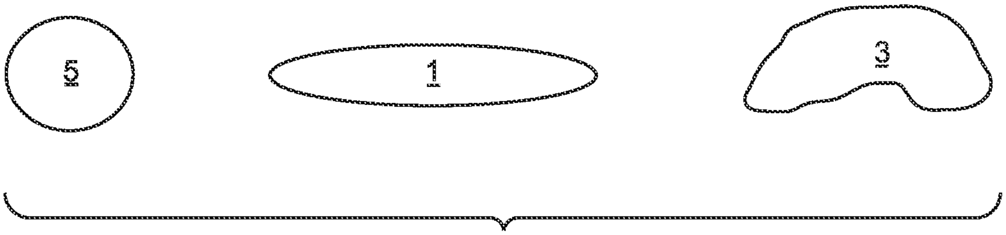
FIG. 4 illustrates a schematic view of three example light distribution optic patterns for the light system in accordance with the principles of the present disclosure.
Figure 7:
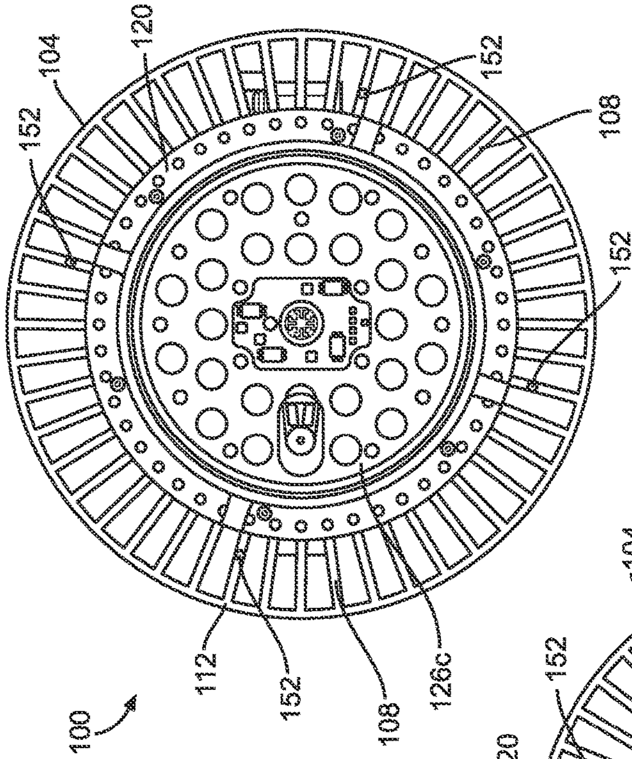
FIG. 7 illustrates a front plan view of the light system of FIG. 1 depicting an LED configuration adapted for generating a Type V optic pattern.
Figure 6:
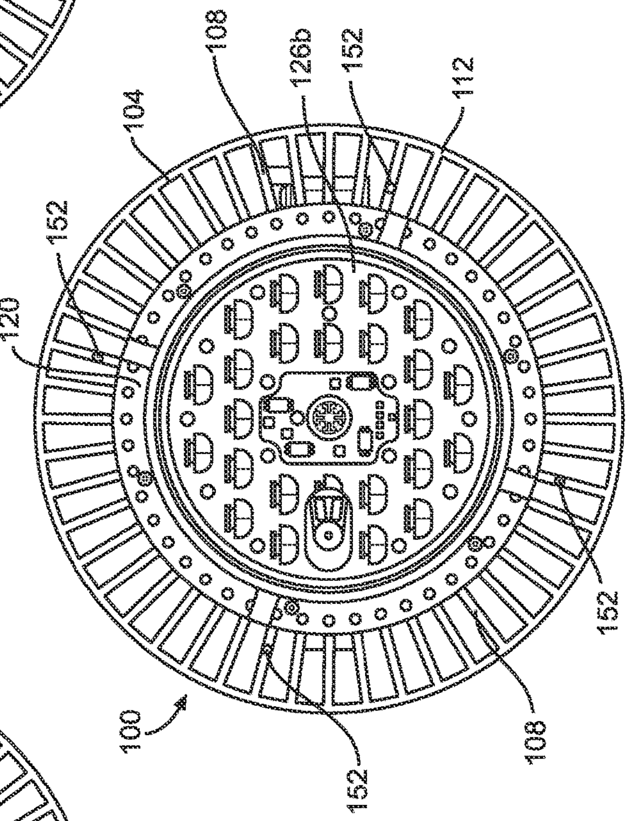
FIG. 6 illustrates a front plan view of the light system of FIG. 1 depicting an LED configuration adapted for generating a Type III optic pattern.
Figure 5:
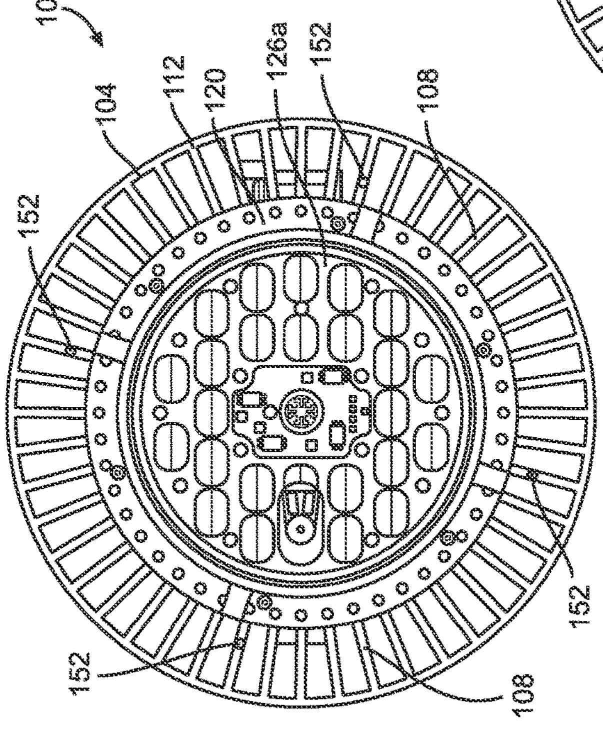
FIG. 5 illustrates a front plan view of the light system of FIG. 1 depicting an LED configuration adapted for generating a Type I optic pattern.

Referring to FIG. 4, one classification system that is used to describe the pattern of the illuminated area by the light system 100 is established by the Illumination Engineering Society of North American (IESNA). IESNA Type I beam pattern has a long and rectangular pattern that is used when the light system 100 is placed near the center of a pathway and provides lighting for narrower paths or roadways. IESNA Type III beam pattern has a bent pattern that is used when the light system 100 is placed towards one side of a pathway and provides lighting that projects more outward. IESNA Type V beam pattern has a regular circular pattern that is used for large buildings, warehouses, processing mills, and industrial plants. FIGS. 5-7 show the example IESNA Type I, III, V optics 126*a-c* that can be used in the light system 100.

Figure 10:
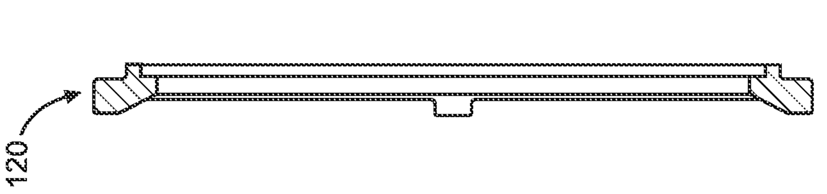
FIG. 10 illustrates a cross-sectional view of the retainer ring of FIG. 8.
Figure 9:
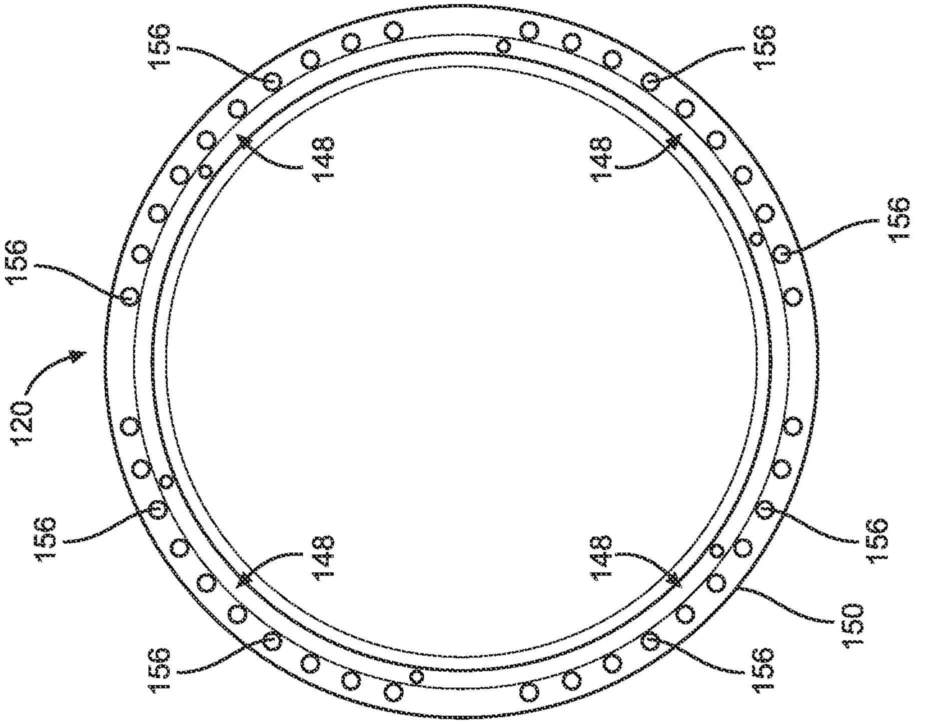
FIG. 9 illustrates a back plan view of the retainer ring of FIG. 8.
Figure 8:
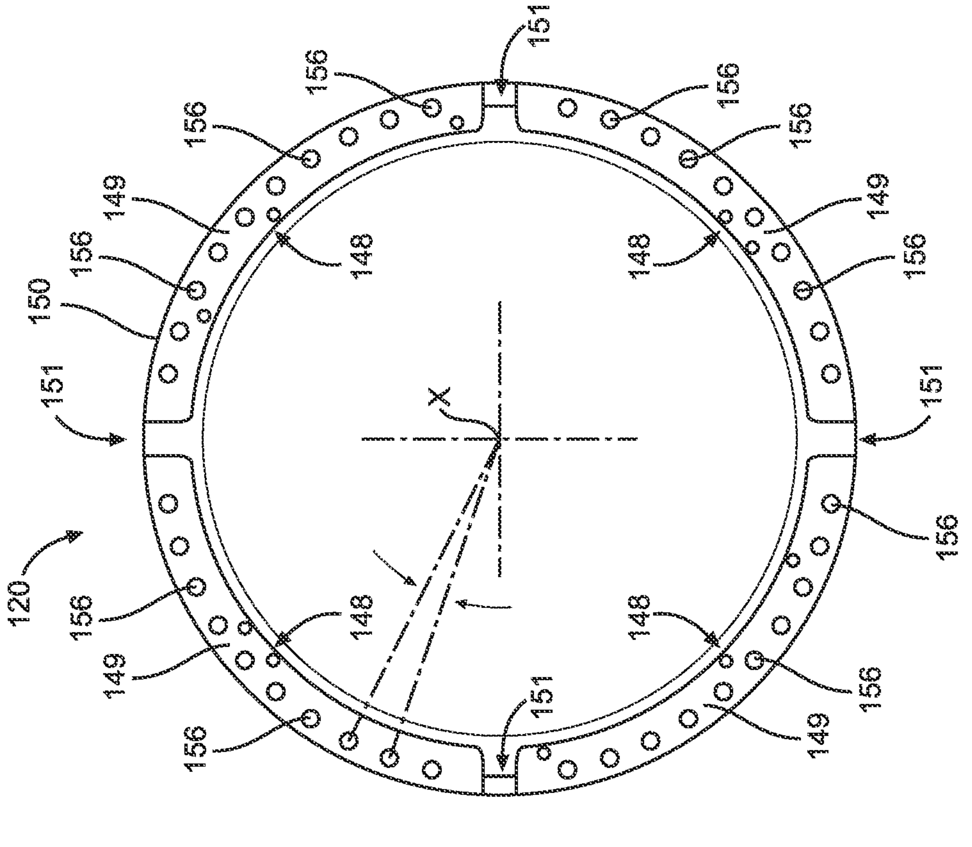
FIG. 8 illustrates a front plan view of a retainer ring of the LED system shown in FIG. 3.

Referring to FIGS. 8-10, illustrates multiple views of the retainer ring 120. The retainer ring 120 includes four equally spaced mounting regions 148 around an outer periphery 150 of the retainer ring 120. The retainer ring 120 can rotate about a central axis X of the light system 100. The mounting regions 148 can allow adjustable rotation of the retainer ring 120 by at least 180 degrees to change the light distribution illumination direction of the light system 100. In certain examples, the retainer ring 120 can be rotated between 45 degrees and 300 degrees to change the light distribution of the light system 100.

The mounting regions 148 of the retainer ring 120 can be used to attach the LED system 106 to the front surface 112 of the heat sink adapter housing 104 via the one or more screws 116. The screws 116 may be fitted into screw holes 152 (e.g., internally threaded holes, openings, see FIGS. 5-7) on the front surface 112 of the heat sink adapter housing 104. In certain examples, the retainer ring 120 may be shaped and sized to engage a cavity 154 (see FIG. 3) defined in the heat sink adapter housing 104 when the LED system 106 is attached thereto.

The mounting regions 148 can each include a plurality of discrete openings 156, although alternatives are possible. The plurality of discrete openings 156 are spaced apart equally in an arcuate array and are located near the outer periphery 150 of the retainer ring 120. In certain examples, the mounting regions 148 can each include a slot opening 154 (see FIG. 15). The mounting regions 148 are diametrically positioned about the retainer ring 120 and are identical to each other. Thus, only one mounting region 148 will be described in detail or referred to. Each of the mounting regions 148 can correspond to a circumferential flange segment 149. The circumferential flange segments 149 can be separated by projections 151. In one example, the plurality of discrete openings 156 are not internally threaded and are slightly oversized with respect to the shanks of the fasteners 116.

The front surface 112 of the heat sink adapter housing 104 defines at least four screw holes 152 that are equally spaced about the heat sink adapter housing 104. The screw holes 152 can each be aligned with a corresponding one of the plurality of parallel-oriented fins 108 of the heat sink adapter housing 104. For example, the four screw holes 152 can be defined in a respective one of the plurality of parallel-oriented fins 108. In certain examples, each screw hole 152 corresponds to one of the mounting regions 148.

In certain examples, there are at least six openings 156 per mounting location 148 for each of the screw holes 152 of the heat sink adapter housing 104. In certain examples, there are at least seven openings 156 per mounting location 148 for each of the screw holes 152 of the heat sink adapter housing 104. In certain examples, there are at least eight openings 156 at each mounting location 148 for each of the screw holes 152 of the heat sink adapter housing 104. In certain examples, there are at least nine openings 156 at each mounting location 148 for each of the screw holes 152 of the heat sink adapter housing 104. In certain examples, there are at least ten openings 156 at each mounting location 148 for each of the screw holes 152 of the heat sink adapter housing 104.

Although the mounting regions 148 are shown on the retainer ring 120 and the screw holes 152 are defined by the heat sink adapter housing 104, the reverse could be provided. That is, the mounting regions 148 can be defined by the heat sink adapter housing 104 and the screw holes 152 can be defined by the retainer ring 120.

Figure 12:
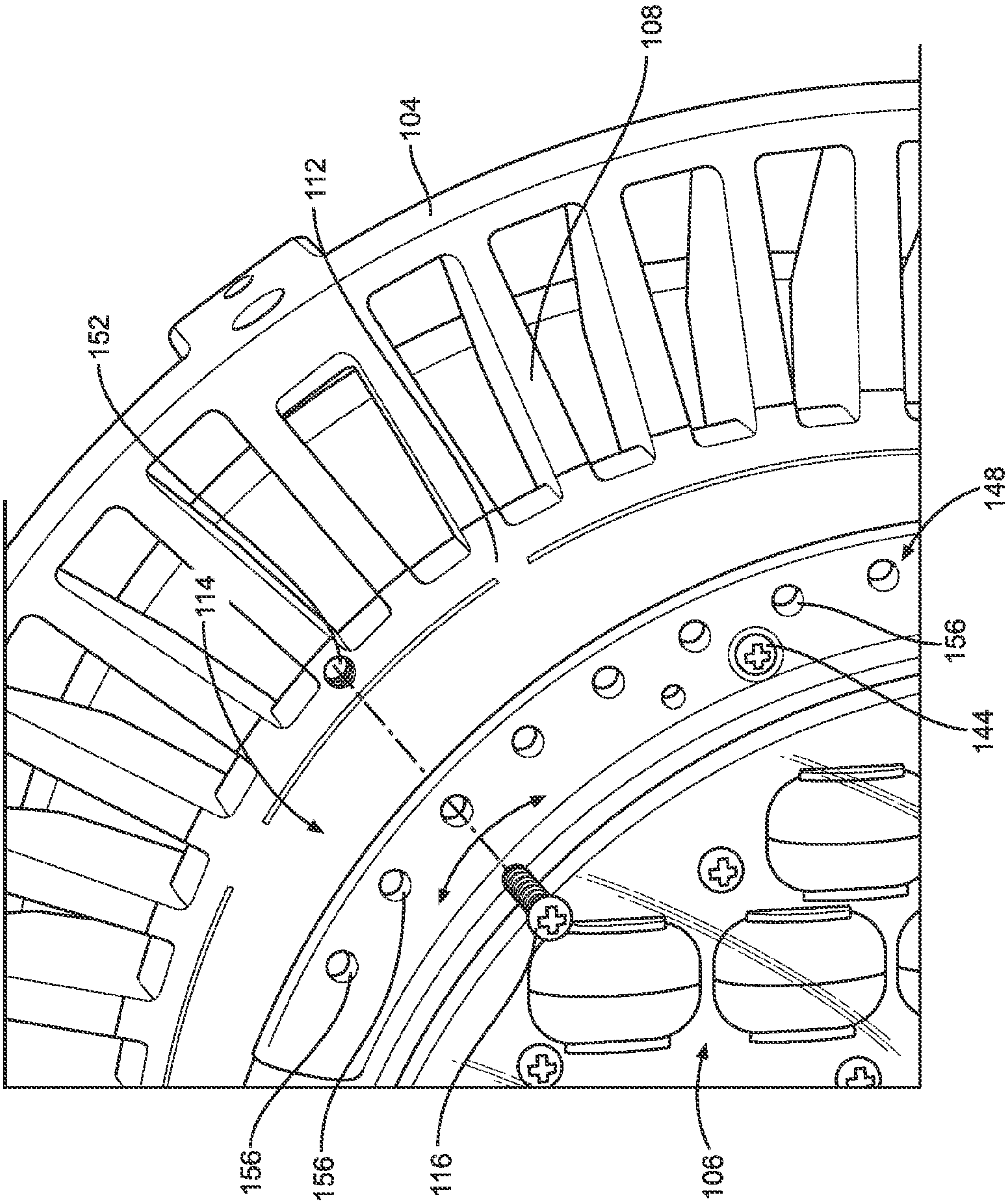
FIG. 12 illustrates a partial enlarged front view of the heat sink adapter housing prior to mounting the LED system thereon.

Referring to FIG. 12, when the LED system 106 is mounted to the heat sink adapter housing 104, one of the plurality of discrete openings 156 of the retainer ring 120 can be respectively aligned with one of the screw holes 152 of the heat sink adapter housing 104. To secure the LED system 106 to the heat sink adapter housing 104, one of the fasteners 116 can be inserted axially through one of the plurality of discrete openings 156 and threaded into the screw holes 152 of the heat sink adapter housing 104. This engagement prevents any movement of the LED system 106 relative to the heat sink adapter housing 104.

Because luminaires are generally placed alongside walkways or conveyer locations where light distribution may not be fully utilized with respect to a road, "clocking" mechanisms can be provided to give a customer flexibility to adjust the light distribution to provide illumination in a desired direction, orientation, or level.

The retainer ring 120 may be configured to alter or otherwise modify the light emitted by the optics 126. When a customer desires to "clock" a luminaire or adjust the lighting path or pattern of the optics 126 of the light system 100, the LED system 106 may be rotated relative to the heat sink adapter housing 104. The amount of rotation needed to achieve a desired light distribution can be determined by using the retainer ring 120. Rotating the retainer ring 120 also rotates the baseplate 118, the PCBA 124, and the optics 126 of the LED system 106. Because the optics 126 can rotate with the retainer ring 120, the illumination direction of the light emitting pattern of the light system 100 can be adjusted.

To adjust the illumination direction of the light system 100, the fasteners 116 are first completely removed from a respective one of the plurality of discrete openings 156 of the retainer ring 120 and the screw hole 152 of the heat sink adapter housing 104. This allows the LED system 106 to be removed from the heat sink adapter housing 104 to allow the LED system 106 to be rotated relative to the heat sink adapter housing 104 to adjust the clock face position and thus the direction of illumination of the light system 100. The plurality of discrete openings 156 of the retainer ring 120 allow the LED system 106 to be moved in discrete increments to achieve a desired light distribution in the field that can yield optimal performance. For example, the plurality of discrete openings 156 of the retainer ring 120 can be rotated in a clockwise or counterclockwise direction relative to the screw hole 152 of the heat sink adapter housing 104 to change the light distribution illumination direction by increments of the plurality of discrete openings 156. That is, the direction in which light distribution of the light system 100 shines can be adjusted as the retainer ring 120 of the LED system 106 is rotated such that a different one of the plurality of discrete openings 156 of the retainer ring 120 can be aligned to the screw hole 152 of the heat sink adapter housing 104.

Turning again to FIG. 8, the plurality of discrete openings 156 may be spaced no more than 10 degrees apart with respect to the central axis X of the light system 100. In certain examples, the plurality of discrete openings 156 may be spaced no more than 9 degrees apart with respect to the central axis X of the light system 100. In certain examples, the plurality of discrete openings 156 may be spaced no more than 8 degrees apart with respect to the central axis X of the light system 100. As such, the light distribution illumination direction can be change by relatively small increments (e.g., increments less than or equal to about 10, 9, or 8 degrees).

After the desired adjustment is made, the fasteners 116 can be reinserted through the selected one of the plurality of openings 156 of the retainer ring 120 and threaded into the screw hole 152 of the heat sink adapter housing 104. This process of "clocking" allows for easy adjustment of luminaires in the field without having to remove the one or more screws 144 that seal the LED system 106. The screws 144 keep the LED system 106 fastened and sealed such that the LED system 106 is not loosened or broken open to give risk to any ingress protection.

Figure 13:
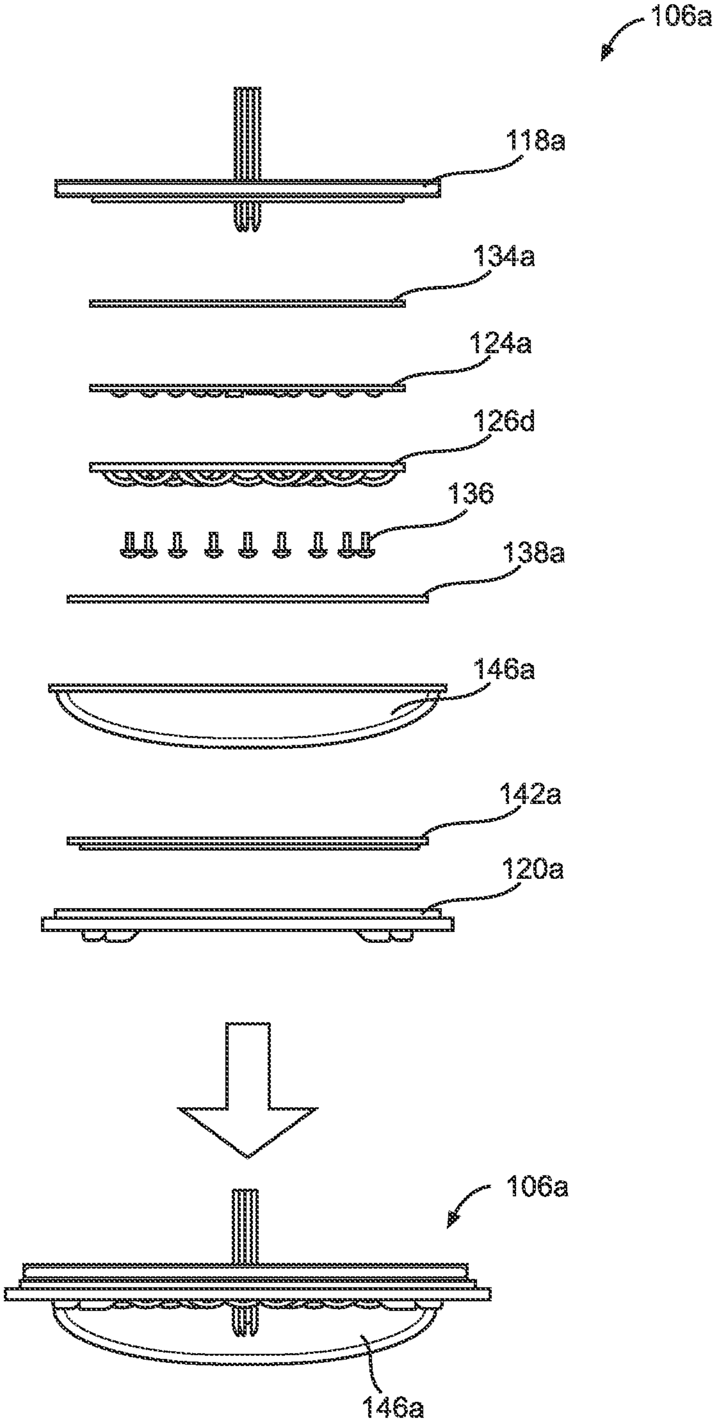
FIG. 13 illustrates an exploded view of an alternative LED system in accordance with the principles of the present disclosure.
Figure 15:
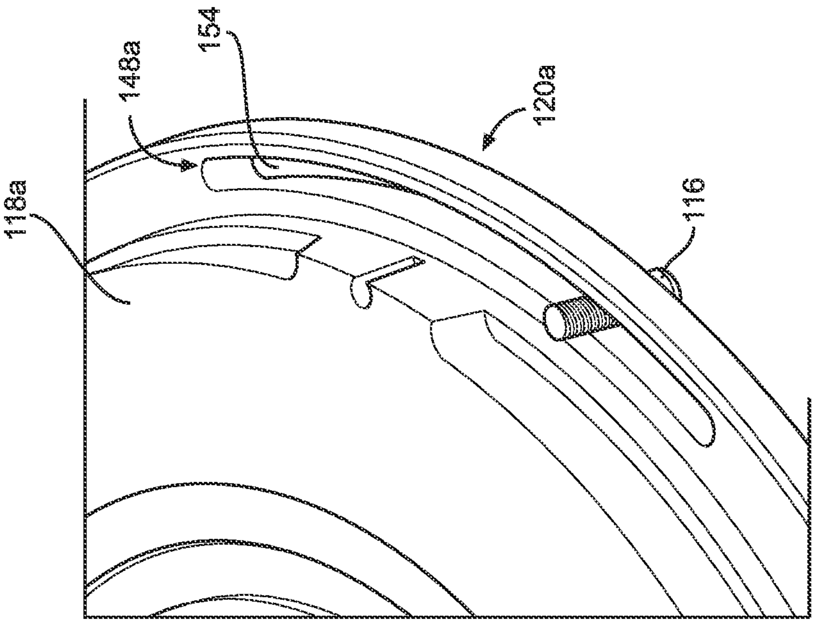
FIG. 15 illustrates a partial view showing a retainer ring and baseplate of the LED system of FIG. 13.
Figure 14:
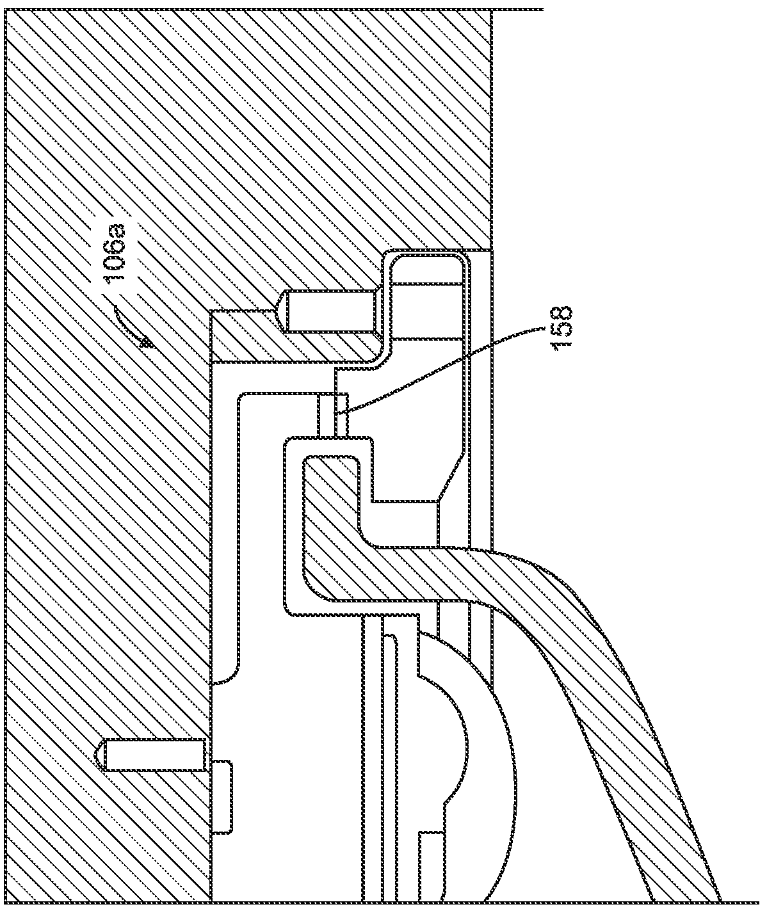
FIG. 14 illustrates a cross-sectional view of the LED system of FIG. 13.

Referring to FIGS. 13-15, an alternative LED system **106*a* is depicted in accordance with the principles of the present disclosure. To the extent that the embodiments are similar, the description will not be repeated and will instead be directed to the primary differences. Specifically, the LED system 106*a* differs in how the retainer ring 120*a* mounts to the baseplate 118*a*. For example, adhesive tape 158 can be used to secure the retainer ring 120*a* and the baseplate 118*a* together. As such, there is a reduction in parts as the screws 144 are replaced by the adhesive tape 158. The adhesive tape 158 can be a double-sided adhesive film. In certain examples, the adhesive tape 158 can have a tensile load capacity of 30 to 40 Newtons (N). In certain examples, the adhesive tape 158** preferably has a tensile strength of about 300N to about 350N.

In addition, the LED system **106*a* differs from the LED system 106 shown in FIG. 3 in that the mounting regions 148*a* of the retainer ring 120*a* include the slot openings 154 versus discrete openings, although it will be appreciated that the discrete openings described above can be used. The fastener 116*a* can be inserted through the slot opening 154 of the retainer ring 120*a* and into the screw hole 152 of the heat sink adapter housing 104*a* to attach the LED system 106*a* to the heat sink adapter housing 104*a***.

The slot openings 154 defined in the retainer ring **120*a* allow the LED system 106*a* to be "clocked" in a desired direction relative to the heat sink adapter housing 104*a* by loosening, but not removing, the fastener 116*a* positioned within the slot openings 154 of the retainer ring 120*a*. The fastener 116*a* can be backed out of the slot opening 154 so that ¼ inch to ½ inch of thread is showing to allow the LED system 106*a* to be rotated relative to the heat sink adapter housing 104*a*** up to about 60 degrees to change the light distribution. In certain examples, the "clocking" direction can include at least about 45 degrees of adjustability.

In certain examples, the fasteners **116*a* can be completely removed from the slot openings 154 if an adjustment needs to be made that is beyond about 60 degrees. The LED system 106*a* can then be adjusted to any desired position. After the light distribution adjustment is complete, the fasteners 116*a* can then be reinserted through the slot openings 154 of the retainer ring 120***a* and into the screw hole 152 of the heat sink adapter housing 104*a* and tightened therein to again secure the LED system 106*a* to the heat sink adapter housing 104*a*.

EXAMPLE ASPECTS OF THE DISCLOSURE

Aspect 1. A light system comprising:
a driver compartment assembly;
a heat sink adapter housing fixed to the driver compartment assembly, the heat sink adapter housing defining a plurality of openings that are each internally threaded;
a light engine adapted to be removably attached to the heat sink adapter housing, the light engine including:
a baseplate;
optics coupled to the baseplate;
a retainer ring removably mounted to the baseplate, the retainer ring including a plurality of mounting regions circumferentially positioned thereabout, wherein the plurality of mounting regions each include a plurality of discrete openings spaced apart equally in an arcuate array, each of the plurality of mounting regions corresponding to a circumferential flange segment of the retainer ring, the circumferential flange segments of the retainer ring being separated by projections, the plurality of discrete openings being defined through the circumferential flange segments, respectively; and
a lens having an outer flange disposed between the baseplate and the retainer ring, the lens at least partially surrounding the optics to enclose the optics on the baseplate;
wherein the retainer ring is rotatable relative to the heat sink adapter in discrete increments via the plurality of discrete openings, the plurality of discrete openings of the plurality of mounting regions each respectively corresponding to one of the plurality of openings of the heat sink adapter, wherein the optics rotate with the retainer ring to change the light distribution illumination direction emitted by the optics.

Aspect 2. The light system of aspect 1, wherein the optics includes one or more light emitting diodes coupled to a substrate.

Aspect 3. The light system of aspect 1, wherein the plurality of discrete openings are spaced no more than 8 degrees apart with respect to a central axis of the light system.

Aspect 4. The light system of aspect 1, wherein the plurality of discrete openings are spaced no more than 10 degrees apart with respect to a central axis of the light system.

Aspect 5. The light system of aspect 1, wherein the optics include an IESNA Type I beam pattern.

Aspect 6. The light system of aspect 1, wherein the optics include an IESNA Type III beam pattern.

Aspect 7. The light system of aspect 1, wherein the plurality of mounting regions allow adjustable rotation of the retainer ring by at least 180 degrees to change the light distribution illumination direction of the optics.

Aspect 8. The light system of aspect 1, wherein the plurality of discrete openings include at least eight discrete openings in the mounting region.

Aspect 9. A light engine comprising:
a baseplate;
optics coupled to the baseplate;
a retainer ring being adhesively attached to the baseplate;
a heat sink adapter housing removably mounted to the retainer ring; and
a lens having an outer flange disposed between the baseplate and the retainer ring, the lens at least partially surrounding the optics to enclose the optics on the baseplate;
wherein the retainer ring and the optics are configured to rotate together relative to the heat sink adapter housing to change the light distribution illumination direction emitted by the optics.

Aspect 10. The light engine of aspect 9, wherein the retainer ring includes four separate mounting regions circumferentially positioned thereabout, each of the four separate mounting regions corresponding to a circumferential flange segment of the retainer ring, the circumferential flange segments of the retainer ring being separated by projections.

Aspect 11. The light engine of aspect 10, wherein the four separate mounting regions each include at least five discrete openings.

Aspect 12. The light engine of aspect 10, wherein the four separate mounting regions each include at least eight discrete openings.

Aspect 13. The light engine of aspect 9, wherein the optics includes one or more light emitting diodes coupled to a substrate.

Aspect 14. The light engine of aspect 10, wherein the four separate mounting regions each include a slot opening.

Aspect 15. A light system defining a central axis, the light system comprising:
a driver compartment assembly;
a heat sink adapter housing fixed to the driver compartment;
a light engine adapted to be removably attached to the heat sink adapter housing, the light engine including:
a baseplate;
optics coupled to the baseplate;
a retainer ring removably mounted to the baseplate;
a lens having an outer flange disposed between the baseplate and the retainer ring, the lens at least partially surrounding the optics to enclose the optics on the baseplate;
at least one mounting region having at least eight discrete openings separated by no more than 10 degrees with respect to the central axis, the at least one mounting region being defined by one of the retainer ring and the heat sink adapter housing; and
at least one opening defined by the other one of the retainer ring and the heat sink adapter housing, the at least one opening being internally threaded and corresponding to the at least one mounting region;
wherein the retainer ring is rotatable relative to the heat sink adapter housing about the central axis, the retainer ring being rotatable in discrete increments via the at least eight discrete openings, the at least eight discrete openings of the at least one mounting region corresponding with the at least one opening, wherein the optics rotate with the retainer ring to change the light distribution illumination direction emitted by the optics.

Aspect 16. The light system of aspect 15, wherein the retainer ring is adhesively mounted to the baseplate.

Aspect 17. The light system of aspect 15, wherein the retainer ring is secured to the baseplate via fasteners.

Aspect 18. The light system of aspect 15, wherein the optics includes one or more light emitting diodes coupled to a substrate.

Aspect 19. The light system of aspect 15, wherein the light engine includes four mounting regions that each correspond to a circumferential flange segment.

Aspect 20. The light system of aspect 19, wherein the circumferential flange segments are separated by projections.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A light system comprising:

a driver compartment assembly;

a heat sink adapter housing fixed to the driver compartment assembly, the heat sink adapter housing defining a plurality of openings that are each internally threaded;

a light engine adapted to be removably attached to the heat sink adapter housing, the light engine including:

a baseplate;

optics coupled to the baseplate;

a retainer ring removably mounted to the baseplate, the retainer ring including a plurality of mounting regions circumferentially positioned thereabout, wherein the plurality of mounting regions each include a plurality of discrete openings spaced apart equally in an arcuate array, each of the plurality of mounting regions corresponding to a circumferential flange segment of the retainer ring, the circumferential flange segments of the retainer ring being separated by projections, the plurality of discrete openings being defined through the circumferential flange segments, respectively; and a lens having an outer flange disposed between the baseplate and the retainer ring, the lens at least partially surrounding the optics to enclose the optics on the baseplate;

wherein the retainer ring is rotatable relative to the heat sink adapter in discrete increments via the plurality of discrete openings, the plurality of discrete openings of the plurality of mounting regions each respectively corresponding to one of the plurality of openings of the heat sink adapter, wherein the optics rotate with the retainer ring to change the light distribution illumination direction emitted by the optics.

2. The light system of claim 1, wherein the optics includes one or more light emitting diodes coupled to a substrate.

3. The light system of claim 1, wherein the plurality of discrete openings are spaced no more than 8 degrees apart with respect to a central axis of the light system.

4. The light system of claim 1, wherein the plurality of discrete openings are spaced no more than 10 degrees apart with respect to a central axis of the light system.

5. The light system of claim 1, wherein the optics include an IESNA Type I beam pattern.

6. The light system of claim 1, wherein the optics include an IESNA Type III beam pattern.

7. The light system of claim 1, wherein the plurality of mounting regions allow adjustable rotation of the retainer ring by at least 180 degrees to change the light distribution illumination direction of the optics.

8. The light system of claim 1, wherein the plurality of discrete openings include at least eight discrete openings in the mounting region.

9. A light engine comprising:

a baseplate;

optics coupled to the baseplate;

a retainer ring attached to the baseplate;

a heat sink adapter housing removably mounted to the retainer ring; and a lens having an outer flange disposed between the baseplate and the retainer ring, the lens at least partially surrounding the optics to enclose the optics on the baseplate;

wherein:

the retainer ring includes four separate mounting regions circumferentially positioned thereabout, each of the four separate mounting regions corresponding to a circumferential flange segment of the retainer ring, the circumferential flange segments of the retainer ring being separated by projections, and the retainer ring and the optics are configured to rotate together relative to the heat sink adapter housing to change the light distribution illumination direction emitted by the optics.

10. The light engine of claim 9, wherein the four separate mounting regions each include at least five discrete openings.

11. The light engine of claim 9, wherein the four separate mounting regions each include at least eight discrete openings.

12. The light engine of claim 9, wherein the optics includes one or more light emitting diodes coupled to a substrate.

13. The light engine of claim 9, wherein the four separate mounting regions each include a slot opening.

14. A light system defining a central axis, the light system comprising:

a driver compartment assembly;

a heat sink adapter housing fixed to the driver compartment;

a light engine adapted to be removably attached to the heat sink adapter housing, the light engine including:

a baseplate;

optics coupled to the baseplate;

a retainer ring removably mounted to the baseplate;

a lens having an outer flange disposed between the baseplate and the retainer ring, the lens at least partially surrounding the optics to enclose the optics on the baseplate;

at least one mounting region having at least eight discrete openings separated by no more than 10 degrees with respect to the central axis, the at least one mounting region being defined by one of the retainer ring and the heat sink adapter housing; and at least one opening defined by the other one of the retainer ring and the heat sink adapter housing, the at least one opening being internally threaded and corresponding to the at least one mounting region;

wherein the retainer ring is rotatable relative to the heat sink adapter housing about the central axis, the retainer ring being rotatable in discrete increments via the at least eight discrete openings, the at least eight discrete openings of the at least one mounting region corresponding with the at least one opening, wherein the optics rotate with the retainer ring to change the light distribution illumination direction emitted by the optics.

15. The light system of claim 14, wherein the retainer ring is adhesively mounted to the baseplate.

16. The light system of claim 14, wherein the retainer ring is secured to the baseplate via fasteners.

17. The light system of claim 14, wherein the optics includes one or more light emitting diodes coupled to a substrate.

18. The light system of claim 14, wherein the light engine includes four mounting regions that each correspond to a circumferential flange segment.

19. The light system of claim 18, wherein the circumferential flange segments are separated by projections.

* * * * *